No. 743,963. PATENTED NOV. 10, 1903.
T. WEIGELE.
TIRE REPAIR TOOL.
APPLICATION FILED FEB. 9, 1903.
NO MODEL.
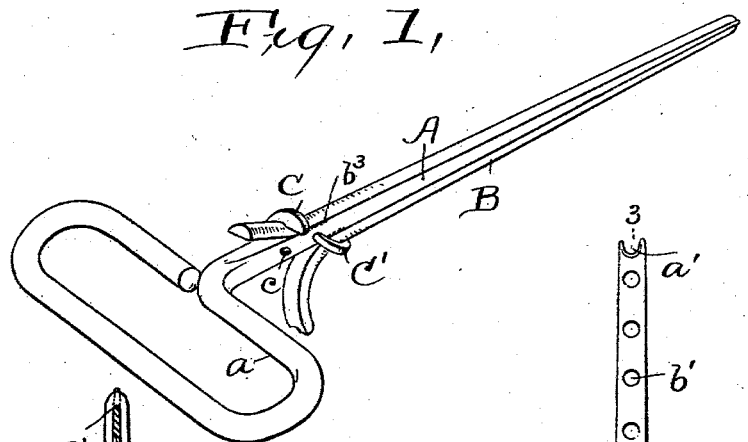
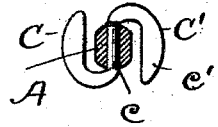
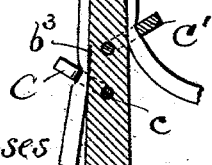
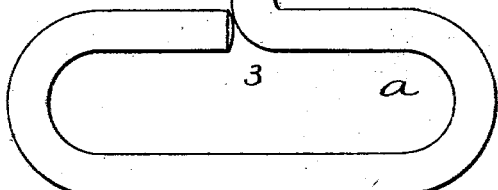
Witnesses
E. B. Gilchrist
N. L. Brennan
Inventor:
Theodore Weigele,
By Thurston & Bates,
Attorneys No. 743,963. Patented November 10, 1903.

UNITED STATES PATENT OFFICE.

THEODORE WEIGELE, OF AKRON, OHIO, ASSIGNOR TO THE DIAMOND RUBBER COMPANY, OF AKRON, OHIO, A CORPORATION OF WEST VIRGINIA.

TIRE-REPAIR TOOL.

SPECIFICATION forming part of Letters Patent No. 743,963, dated November 10, 1903.

Application filed February 9, 1903. Serial No. 142,441. (No model.)

*To all whom it may concern:*

Be it known that I, THEODORE WEIGELE, a citizen of the United States, residing at Akron, in the county of Summit and State of Ohio, have invented a certain new and useful Improvement in Tire-Repair Tools, of which the following is a full, clear, and exact description, reference being had to the accompanying drawings.

The invention is an improved tool designed for use in forcing a two-strand repair-plug of stretched rubber into a hole in a pneumatic tire, whereby when the tool itself is withdrawn this rubber plug will expand and close said hole.

The invention consists in a tool having the characteristics of construction which are hereinafter described, and pointed out definitely in the claims.

In the drawings, Figure 1 is a perspective view of the tool holding the stretched rubber repair-plug. Fig. 2 is a side elevation of said tool without the rubber plug, and Fig. 3 is a transverse sectional view in the plane indicated by line 3 3 of Fig. 2. Fig. 4 is a cross-section on the line of the pivot of one of the clamps.

The tool consists of a bar A, which is preferably slightly tapered and which has at one end a convenient handle $a$ and in the other a notch $a'$ for the reception of the bent portion of the two-strand rubber repair-plug B. In one or both sides of this bar are several depressions $b'$, into which it is intended that rubber cement shall be placed before the rubber is placed in the embrace of the tool. Near the handle end of the tool are two automatic clamps C C', which are pivoted to the bar A on parallel transverse pivots $c$, and each has a clamping-finger $c'$, which is substantially parallel with its pivot. The adjacent part of the bar is preferably serrated, as at $b^3$.

In using the device one preferably employs a strip of rubber which is semicircular in cross-section. This rubber is slightly stretched and placed beneath one of the clamps C, which is swung forward against the rubber, the flat side of the rubber being against the side of the tool. The expansion of the rubber behind this clamp forms a sort of shoulder which when the rubber is stretched in front of said clamp engages with the clamp and swings it still farther forward, wherefore the rubber is more firmly clamped to the bar. The rubber in front of this clamp is then stretched and drawn over the bar A, lying in the notch $a$ therein, and then down along the opposite side of the bar and under the other clamp C', which is swung forward against it. Upon relaxing the pull upon the rubber this clamp C' will be found to be holding the rubber firmly clamped against the side of the tool. These clamps act automatically to hold the more firmly the more it is stretched. To use the stretched plug thus held by the tool, it is necessary first that there should be a suitable hole in the tire to be mended. The outside of the rubber is smeared with suitable cement, and then the tool carrying this two-strand stretched rubber plug is forced through this hole. Then the operator merely with his fingers draws the two clamps toward the handle, whereby each will release that strand of the rubber plug which it is holding. The plug thereupon expands within the hole, and the tool may be withdrawn. The rubber-cement which, had been previously placed in the recesses $b$ in the sides of the tool, will provide sufficient lubrication for the easy withdrawal of the tool and will at the same time smear the contiguous faces of this rubber plug, so that when the tool is withdrawn they will cement themselves firmly together. After the tool is withdrawn the projecting outer ends of the rubber plug may be cut off.

Having described my invention, I claim—

1. A tire-repair tool consisting of a bar having pivoted to it two automatic clamps adapted to swing toward the sides of the bar and bite into a stretched rubber plug between the clamps and the bar sides, substantially as set forth.

2. A tire-repair tool consisting of a bar having two automatic clamps pivoted to the bar and freely overhanging opposite sides thereof, whereby they are adapted to clamp a stretched rubber plug between them and such sides, substantially as set forth.

3. A tire-repair tool consisting of a bar provided with a handle at one end, and having near its handle a pair of pivoted clamps adapted to swing toward the bar and engage a rubber plug, the surface of the bar on its sides adjacent to said clamps being serrated, substantially as set forth.

4. A tire-repair tool consisting of a bar having recesses in its sides, a notch in one end, and a handle on the other end, and two automatic clamps pivoted to said bar near the handle end thereof, substantially as set forth.

5. A tire-repair tool consisting of a bar having a notch in one end, and having, at a suitable distance therefrom two automatic clamps which are pivoted to said bar on parallel transverse pivots and have fingers which overhang the bar on opposite sides thereof and which are substantially parallel with the said pivots, substantially as specified.

In testimony whereof I hereunto affix my signature in the presence of two witnesses.

THEODORE WEIGELE.

Witnesses:
A. G. PARTRIDGE,
E. H. BOOTH.